US012092287B2

(12) United States Patent
Chen

(10) Patent No.: US 12,092,287 B2
(45) Date of Patent: Sep. 17, 2024

(54) DECORATIVE FLOOR DOWN LAMP

(71) Applicant: Dongguan LianRun Lighting Co., Ltd., Dongguan (CN)

(72) Inventor: Kunpeng Chen, Dongguan (CN)

(73) Assignee: Dongguan LianRun Lighting Co., Ltd., Dongguan (CN)

( * ) Notice: Subject to any disclaimer, the term of this patent is extended or adjusted under 35 U.S.C. 154(b) by 3 days.

(21) Appl. No.: 18/458,394

(22) Filed: Aug. 30, 2023

(65) Prior Publication Data

US 2023/0408049 A1 Dec. 21, 2023

(30) Foreign Application Priority Data

Aug. 23, 2023 (CN) ......................... 202322264679.2

(51) Int. Cl.
*F21S 6/00* (2006.01)
*F21V 1/00* (2006.01)
*F21V 21/08* (2006.01)

(52) U.S. Cl.
CPC ................ *F21S 6/004* (2013.01); *F21V 1/00* (2013.01); *F21V 21/0824* (2013.01)

(58) Field of Classification Search
CPC . F21V 21/0824; F21V 1/00; F21W 2131/109; F21W 2131/10; F21S 8/081; F21S 6/004
See application file for complete search history.

(56) References Cited

U.S. PATENT DOCUMENTS 5,034,868 A * 7/1991 Stelfox ................. F21V 19/006 362/352
5,649,760 A * 7/1997 Beadle .................... F21V 17/02 362/267
2006/0126348 A1 6/2006 Lee
2011/0051434 A1 3/2011 Lin
2015/0300592 A1 10/2015 Liu

* cited by examiner

*Primary Examiner* — William J Carter
(74) *Attorney, Agent, or Firm* — Zhigang Ma

(57) ABSTRACT

The present disclosure relates to the technical field of decorative floor lamps, and discloses a decorative floor down lamp. The decorative floor down lamp includes a lampshade and a lamp arranged in the lampshade, and further includes a mounting support and a ground plug; a first assembling portion and a second assembling portion are respectively arranged on two sides of the mounting support; a first through hole and a second through hole are respectively arranged on two sides of the lampshade; the first assembling portion passes through the first through hole and extends out of the lampshade; the second assembling portion passes through the second through hole and extends out of the lampshade; the first assembling portion and the second assembling portion are each provided with a first connection hole; and the ground plug passes through the first connection holes to fix the entire down lamp on the ground.

10 Claims, 7 Drawing Sheets

DECORATIVE FLOOR DOWN LAMP

TECHNICAL FIELD

The present disclosure relates to the technical field of decorative floor lamps, and in particular, to a decorative floor down lamp.

BACKGROUND

Lamps were originally main equipment used for lighting. With the development of technologies, lamps have gradually transformed from traditional tungsten filament lamps to more energy-efficient and environmentally-friendly light-emitting diode (LED) lamps. Functions of lamps are no longer limited to lighting, but also have a decoration effect to create different atmospheres. A variety of decorative lamps have emerged in the market, among which, decorative floor lamps, also referred to as lawn lamps, are commonly used in floor decoration.

Chinese patent CN202121957568.4 discloses an intelligent lawn lamp, including: a lamp housing, provided with a first proximity sensor, a second proximity sensor, a first arrow indicator lamp, and a second arrow indicator lamp. The first proximity sensor and the second proximity sensor are uniformly arranged along a circumferential direction of an outer wall of the lamp housing. In the prior art, a lamp is directly placed on a lawn surface for use. However, due to a light weight of the lamp itself and a relatively high lamp body, as well as an uneven lawn surface, the lamp itself cannot stand stably and is easily tilted and overturned in wind. The lamp needs to be constantly straightened manually, which is inconvenient to use and affects an outdoor decoration effect. In view of this, the inventor has made a new invention.

SUMMARY

The present disclosure aims to overcome the shortcomings in the prior art, and provides a decorative floor down lamp, which has the characteristics of stable placement and convenience in use.

In order to achieve the above objective, the present disclosure provides a decorative floor down lamp, including a lampshade and a lamp arranged in the lampshade, and further includes a mounting support and a ground plug; the mounting support is arranged in the lampshade, and the lamp is mounted on the mounting support; a first assembling portion and a second assembling portion are respectively arranged on two sides of the mounting support; a first through hole and a second through hole are respectively arranged on two sides of the lampshade; a spacing distance D is reserved between each of the first through hole and the second through hole and a bottom of the lampshade; the first assembling portion passes through the first through hole and extends out of the lampshade; the second assembling portion passes through the second through hole and extends out of the lampshade; the first assembling portion and the second assembling portion are each provided with a first connection hole; and the ground plug passes through the first connection holes to limit the lampshade and fix the down lamp on the ground.

Preferably, the mounting support includes a supporting plate and a plug plate which are detachably connected; the supporting plate and the plug plate are connected to each other to form an accommodating position configured to mount the lamp; and the first assembling portion and the second assembling portion are respectively arranged on two sides of the supporting plate.

Further, the supporting plate is provided with a first arc portion; the plug plate is provided with a second arc portion; and the first arc portion and the second arc portion are fastened to each other to form the accommodating position.

Further, the supporting plate is symmetrically provided with a group of assembling slots, and two sides of the plug plate are plugged into the assembling slots.

Much further, two sides of the plug plate are outwards provided with assembling slots; the supporting plate is provided with a notch for accommodating the plug plate; and two sides of the notch are plugged to the assembling slots.

Preferably, both the first assembling portion and the second assembling portion are provided with second connection holes; the decorative floor down lamp further includes a clamping member; and the clamping member is mounted on the second connection holes.

Further, the lamp includes a lamp holder and a bulb connected to the lamp holder; the lamp holder is mounted on the mounting support; the lamp holder is electrically connected with an electrical wire; and the bottom of the lampshade is provided with a first wire outlet and a second wire outlet for allowing the electrical wire to pass.

Preferably, a group of first clamping blocks are relatively arranged below the first wire outlet; a first space is arranged between the first clamping blocks; a group of second clamping blocks are relatively arranged below the second wire outlet; and a second space is arranged between the second clamping blocks.

Preferably, a top of the lampshade is provided with a decorative portion.

Preferably, the mounting support is hollowed.

Beneficial effects: Compared with the prior art, the present disclosure is a decorative floor down lamp, including a lampshade and a lamp arranged in the lampshade, and further including a mounting support and a ground plug. A first assembling portion and a second assembling portion are respectively arranged on two sides of the mounting support. A first through hole and a second through hole are respectively arranged on two sides of the lampshade. The first assembling portion and the second assembling portion are each provided with a first connection hole. The ground plug passes through the first connection holes to fix the entire down lamp on the ground. The present disclosure has the following advantages: 1. The down lamp is placed stably and firmly and is not easily tilted or overturned by an external environment. 2. The down lamp has a simple overall structure and low preparation costs. 3. The mounting support is detachably composed of the supporting plate and the plug plate, so that the flexibility is high; it is convenient to replace the lamp; and the use costs are effectively reduced.

Figure 1:
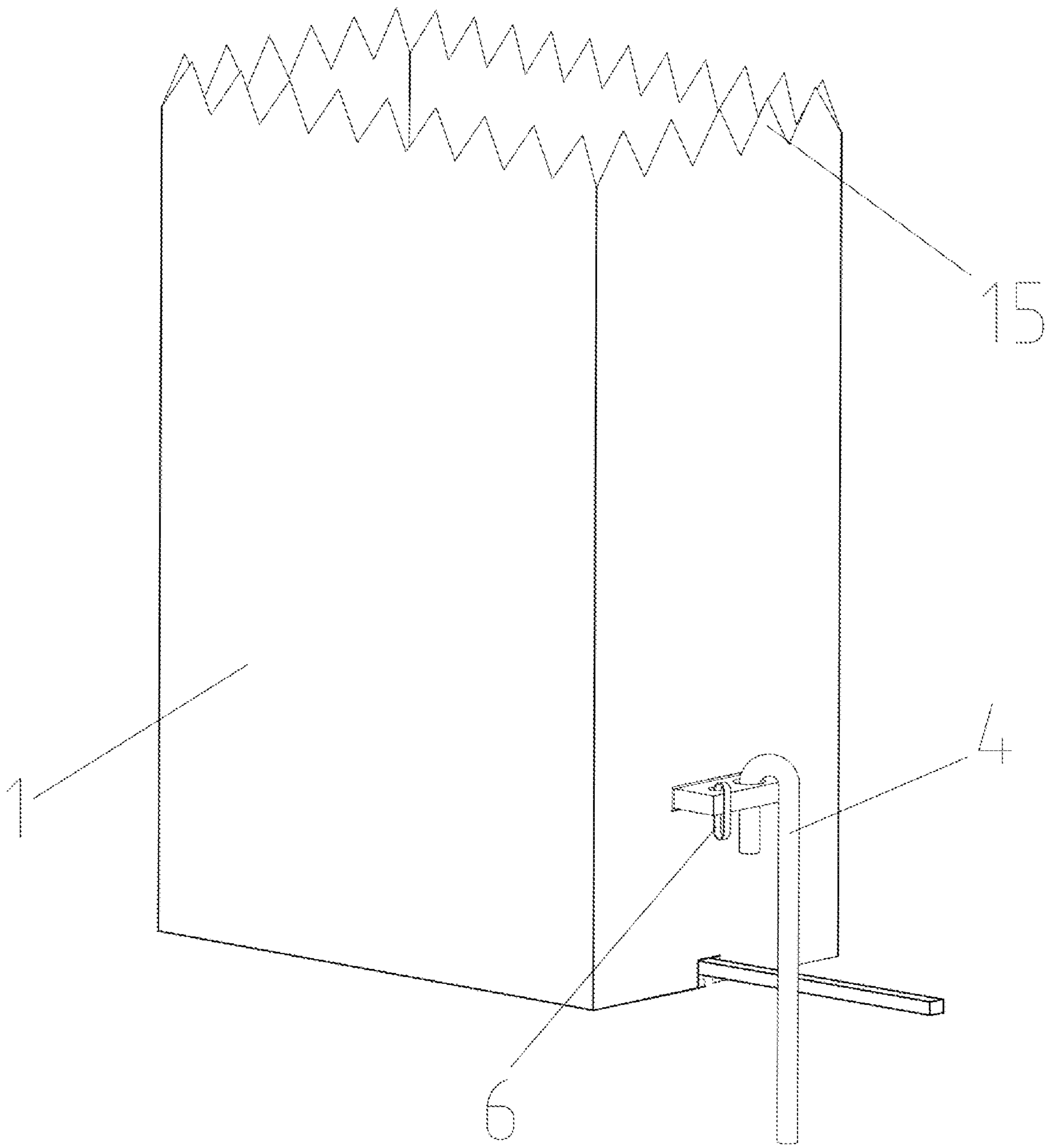
FIG. 1 is a schematic diagram of a three-dimensional structure of the present disclosure.

Reference numerals include:

1: lampshade; 11: first through hole; 12: second through hole; 13: first wire outlet; 131: first clamping block; 132: first space; 14: second wire outlet; 141: second clamping block; 142: second space; 15: decorative portion; 2: lamp; 21: lamp holder; 211: electrical wire; 22: bulb; 3: mounting support; 31: first assembling portion; 32: second assembling portion; 33: first connection hole; 34: supporting plate; 341: first arc portion; 342: notch; 35: plug plate; 351: second arc portion; 36: accommodating position; 37: second connection hole; 4: ground plug; 5: assembling slot; and 6: clamping member.

DETAILED DESCRIPTION OF THE EMBODIMENTS

The present disclosure is described in detail below in combination of FIG. 1 to FIG. 7.

The present disclosure is a decorative floor down lamp, including a lampshade 1 and a lamp 2 arranged in the lampshade 1, and further including a mounting support 3 and a ground plug 4. The mounting support 3 is arranged in the lampshade 1, and the lamp 2 is mounted on the mounting support 3. A first assembling portion 31 and a second assembling portion 32 are respectively arranged on two sides of the mounting support 3. A first through hole 11 and a second through hole 12 are respectively arranged on two sides of the lampshade 1. A spacing distance D is reserved between each of the first through hole 11 and the second through hole 12 and a bottom of the lampshade 1. The first assembling portion 31 passes through the first through hole 11 and extends out of the lampshade 1. The second assembling portion 32 passes through the second through hole 12 and extends out of the lampshade 1. The first assembling portion 31 and the second assembling portion 32 are each provided with a first connection hole 33. The ground plug 4 passes through the first connection holes 33 to limit the lampshade 1 and fix the down lamp on the ground.

According to the present disclosure, the first through hole 11 and the second through hole 12 are respectively formed in the two sides of the lampshade 1, and the mounting support 3 is provided with the first assembling portion 31 and the second assembling portion 32 in a matched manner. The first assembling portion 31 and the second assembling portion 32 are respectively threaded out of the through holes in the two sides of the lampshade 1, and the first connection holes 33 are formed in portions, extending out of the lampshade 1, of the assembling portions. On the one hand, this structure is configured to suspend and fix the mounting support 3; and on the other hand, the ground plug 4 is conveniently used to limit the lampshade 1, so that the mounting support 3 and the lampshade 1 cooperate with each other. Meanwhile, during use, the ground plug 4 is plugged into the ground such as a lawn, so that the entire down lamp can be fixed on the ground. After the down lamp is placed on the ground, the down lamp is stable and is not easily tilted and overturned under the influence of an external force such as wind and rain, so as to achieve a relatively good decorative light effect. In addition, according to the down lamp of this technical solution, the lampshade 1 and the lamp 2 are connected only using one mounting support 3, so that the down lamp has a simple structure and low preparation costs. Meanwhile, the lamp 2 can be suspended in the lampshade 1 and is not in direct contact with the ground, which effectively avoids the influence of an external factor such as ground moisture on the lamp 2 and is conductive to improving the safety of use of the lamp 2. In this technical solution, the distance D between each of the first through hole 11 and the second through hole 12 and the bottom of the lampshade 1 is at least 63.0 mm or above. The distance D can be adjusted according to an actual situation.

Figure 6:
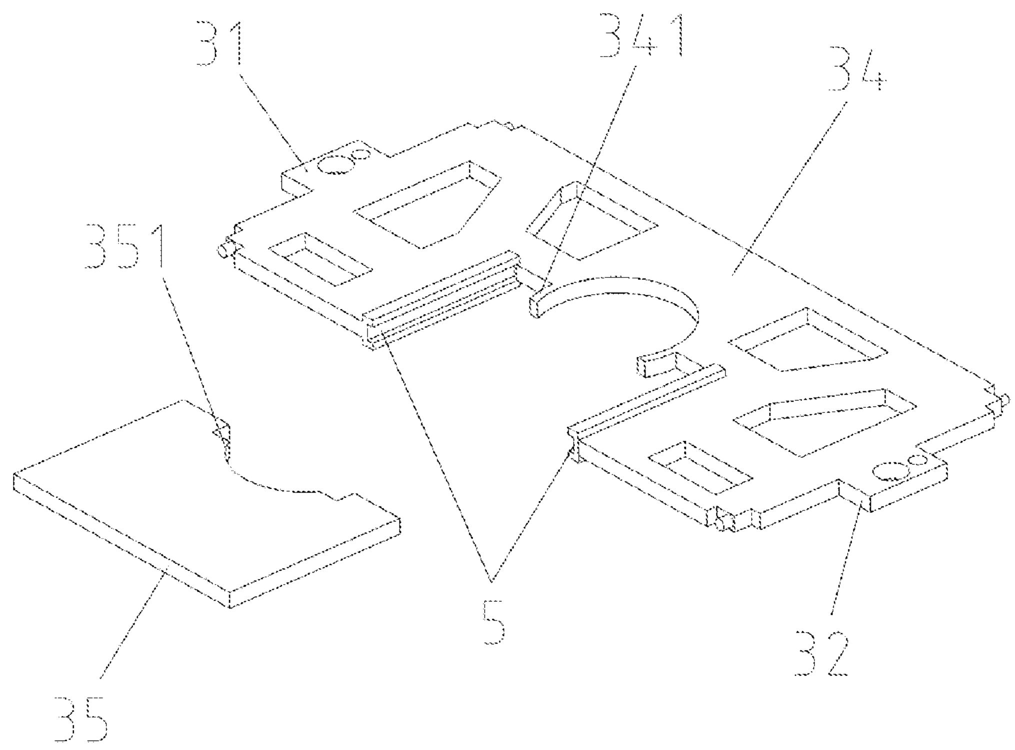
FIG. 6 is a schematic structural diagram of one embodiment of a mounting support of the present disclosure.
Figure 7:
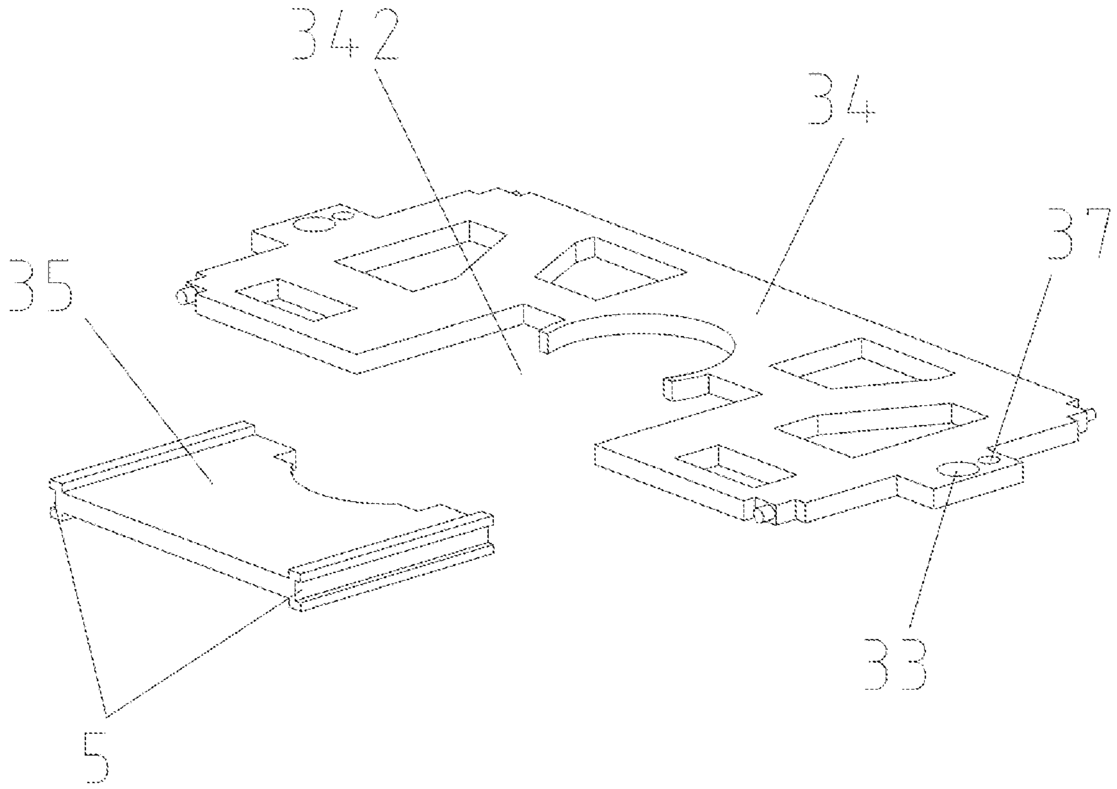
FIG. 7 is a schematic structural diagram of another embodiment of a mounting support of the present disclosure.

As a preference, as shown in FIG. 6 and FIG. 7, the mounting support 3 includes a supporting plate 34 and a plug plate 35 which are detachably connected; the supporting plate 34 and the plug plate 35 are connected to each other to form an accommodating position 36 configured to mount the lamp 2. During use, the lamp 2 is fixedly mounted in the accommodating position 36. The first assembling portion 31 and the second assembling portion 32 are respectively arranged on in middle portions of two sides of the supporting plate (34). The detachable distribution of the mounting bracket 3 makes the flexibility of the down lamp higher, and the mounting bracket 3 can be disassembled at any time to replace different types of lamps 2 to adapt to different usage scenarios.

As an embodiment, the accommodating position 36 of this technical solution is round. The supporting plate 34 is provided with a first arc portion 341. The plug plate 35 is provided with a second arc portion 351. After the supporting plate 34 and the plug plate 35 are assembled, the first arc portion 341 and the second arc portion 351 are fastened to each other to exactly form the round accommodating position 36. The round accommodating position 36 is clamped with a horn-shaped opening of the lamp holder 21, so that the lamp 2 can be fixedly mounted in the accommodating position 36. This embodiment not only achieves the purpose of mounting the lamp 2, but also has a simple structure, which is in line with the low-cost production concept of the present disclosure.

As an embodiment, as shown in FIG. 6, a notch 342 for accommodating the plug plate 35 is formed in the middle of the supporting plate 34, and two sides of the notch 342 are provided with a group of assembling slots 5. The supporting plate 34 and the plug plate 35 are fixedly assembled through the assembling slots 5. The assembling slots 5 can also be arranged on the plug plate 35, as shown in FIG. 7. When the supporting plate 34 and the plug plate 35 are plugged and assembled using the assembling slots 5, the supporting plate and the plug plate have the advantage of being more convenient and fast to assemble and disassemble compared to other assembling methods.

To further improve the technical solution, both the first assembling portion 31 and the second assembling portion 32 are provided with second connection holes 37. The decorative floor down lamp further includes a clamping member 6. The clamping member 6 is mounted on the second connection holes 37. As shown in FIG. 1, the second connection holes 37 are arranged next to the first connection holes 33. The closed-loop clamping member 6 is mounted in the second connection holes 37. A volume of the clamping member 6 is greater than a volume of the first through hole 11 and a volume of the second through hole 12. When the down lamp is not grounded and the ground plug 4 is not used, the clamping member 6 can be clamped to the through holes on the two sides of the lamp holder 21, which effectively prevents the assembling portions from contracting into the lampshade 1 and prevents the mounting support 3 from falling off.

In this technical solution, the lamp 2 includes a lamp holder 21 and a bulb 22 connected to the lamp holder 21. The lamp holder 21 is mounted on the mounting support 3. The lamp holder 21 is electrically connected with an electrical wire 211. The bottom of the lampshade 1 is provided with a first wire outlet 13 and a second wire outlet 14 for allowing the electrical wire 211 to pass. When the down lamp is mounted on the ground, the first wire outlet 13 and the second wire outlet 14 limit the electrical wire 211 to the bottom position of the lampshade 1, which standardizes wiring and reduces the influence of the electrical wire 211 on the decoration effect of the down lamp.

Figure 2:
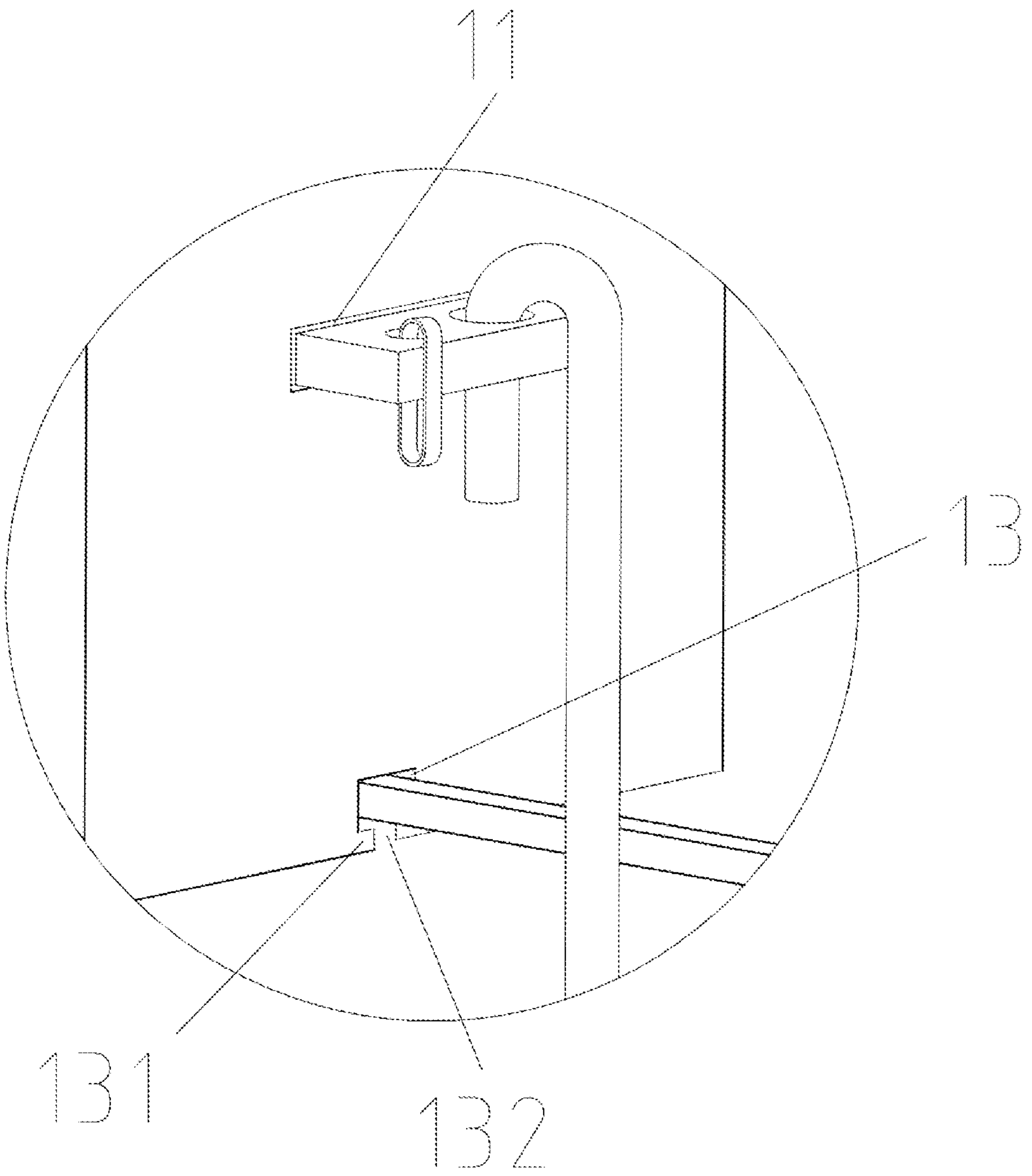
FIG. 2 is a schematic structural diagram of a first through hole and a first wire outlet of the present disclosure.
Figure 3:
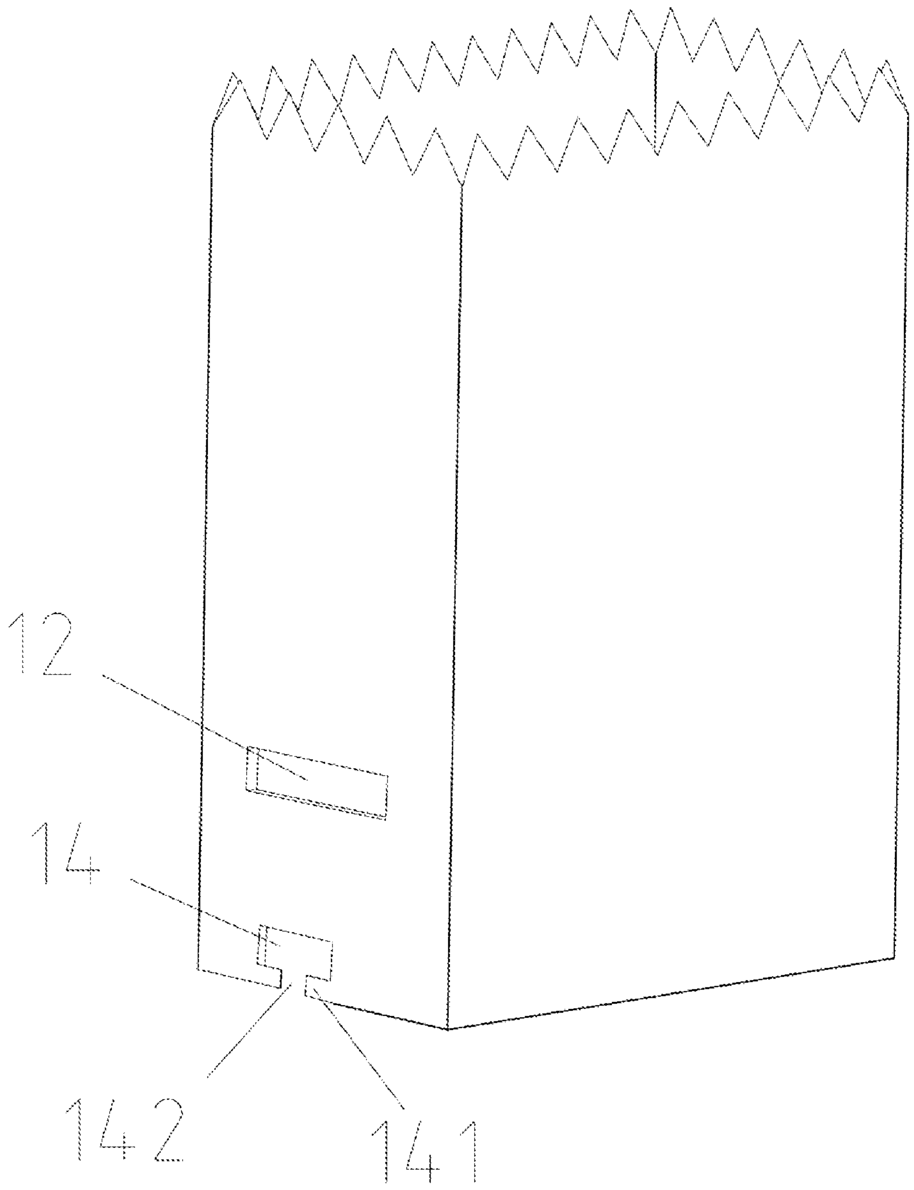
FIG. 3 is a schematic structural diagram of a second through hole and a second wire outlet of the present disclosure.
Figure 4:
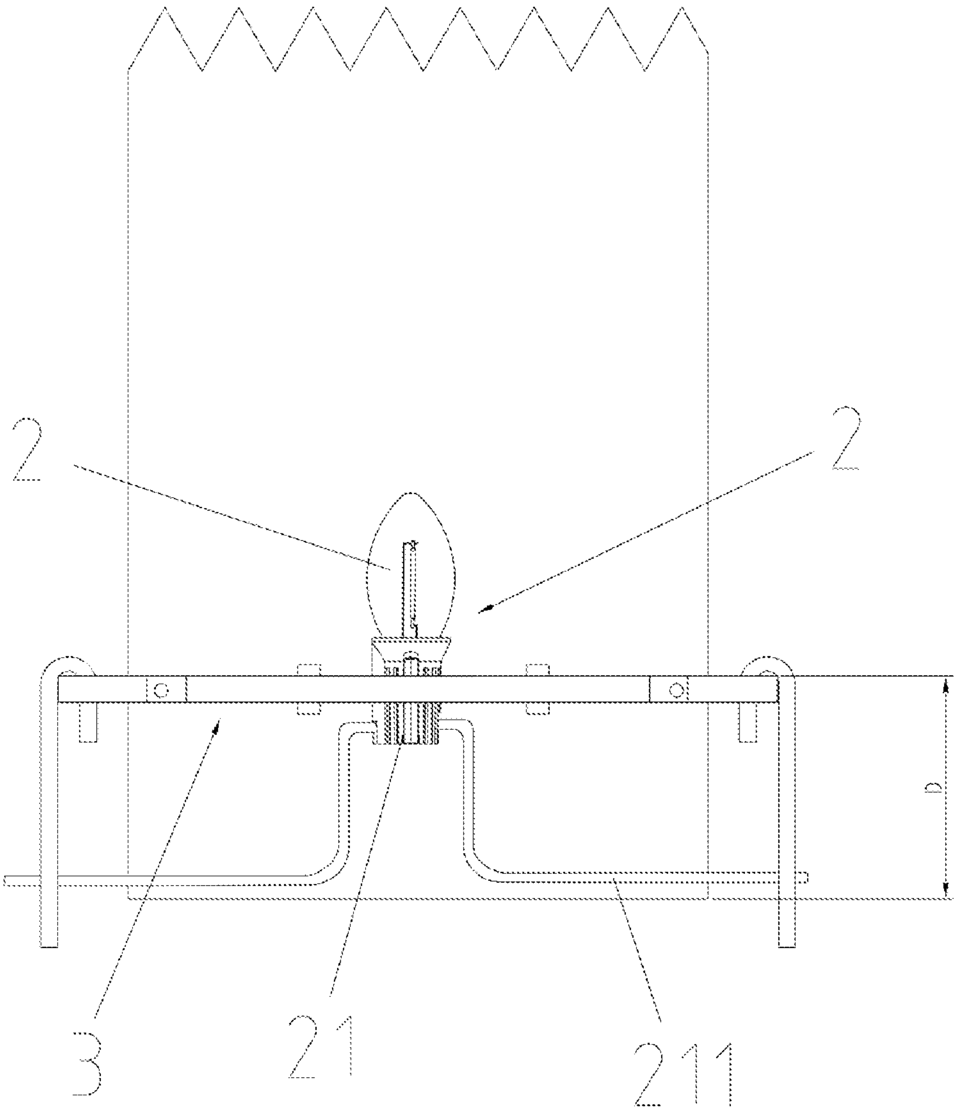
FIG. 4 is a schematic diagram of an internal structure of a lampshade of the present disclosure.
Figure 5:
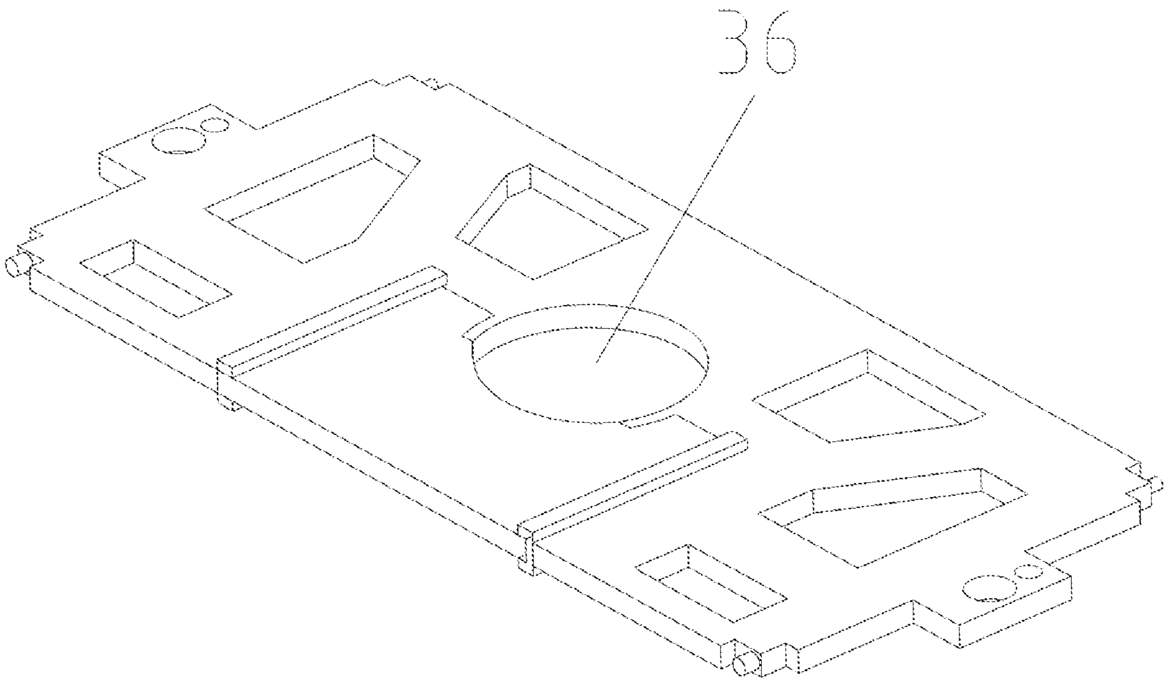
FIG. 5 is a schematic structural diagram of a mounting support of the present disclosure.

To further improve the technical solution, as shown in FIG. 2 and FIG. 3, the inventor symmetrically arranges a group of clamping blocks respectively below the first wire outlet 13 and the second wire outlet 14, and a space is reserved between the two opposite clamping blocks, so that the wire is snapped in positions above the wire outlets. The clamping blocks transform the first wire outlet 13 and the second wire outlet 14 into nearly closed through holes. When the electrical wire 211 is threaded out of the wire outlets, the lower clamping blocks can further limit and fix the electrical wire 211 and separate the electrical wire 211 from a bottom surface, which can also prevent water vapor from corroding the electrical wire.

Preferably, a top of the lampshade 1 is provided with a decorative portion 15. The decorative portion 15 is formed by a plurality of triangles arranged side by side to enhance the decoration effect of the lampshade 1.

Preferably, the mounting support 3 is hollowed. The hollowed mounting support 3 can save raw materials and reduce the production costs.

The above contents are only preferred embodiments of the present disclosure. Those of ordinary skill in the art can make changes to the specific implementations and application scopes according to the idea of the present disclosure, and the contents of this specification shall not be understood as restrictions to the present disclosure.

What is claimed is:

1. A decorative floor down lamp, comprising:

a lampshade (1) arranged on ground, wherein the lampshade (1) is provided, on two opposite sidewalls, with a first through hole (11) and a second through hole (12); wherein a spacing distance is reserved between each of the first through hole (11) and the second through hole (12) and a bottom of the lampshade (1);

a lamp (2) arranged in the lampshade (1);

a mounting support (3) arranged in the lampshade (1), wherein the lamp (2) is mounted on the mounting support (3); the mounting support (3) is provided with a first assembling portion (31) and a second assembling portion (32) that respectively extend from two opposite ends of the mounting support (3); the first assembling portion (31) and the second assembling portion (32) are each provided with a first connection hole (33); wherein the first assembling portion (31) is configured to pass through the first through hole (11) and extend out of the lampshade (1), the second assembling portion (32) is configured to pass through the second through hole (12) and extend out of the lampshade (1), thereby suspending and mounting the mounting support (3) on the lampshade (1), and extending the first connection hole (33) out of the lampshade (1); and a ground plug (4) arranged outside the lampshade (1), and configured to pass through the first connection hole (33), to limit the mounting support (3) on the lampshade (1) and fix the down lamp on the ground.

2. The decorative floor down lamp according to claim 1, wherein the mounting support (3) comprises a supporting plate (34) and a plug plate (35) which are detachably connected; the supporting plate (34) and the plug plate (35) are connected to each other to form an accommodating position (36) configured to mount the lamp (2); and the first assembling portion (31) and the second assembling portion (32) respectively extend from two opposite ends of the supporting plate (34).

3. The decorative floor down lamp according to claim 2, wherein the supporting plate (34) is provided with a first arc portion (341); the plug plate (35) is provided with a second arc portion (351); and the first arc portion (341) and the second arc portion (351) are fastened to each other to form the accommodating position (36).

4. The decorative floor down lamp according to claim 2, wherein the supporting plate (34) is symmetrically provided with a group of assembling slots (5), and two sides of the plug plate (35) are configured to be plugged into the assembling slots (5).

5. The decorative floor down lamp according to claim 2, wherein two sides of the plug plate (35) are outwards provided with assembling slots (5); the supporting plate (34) is provided with a notch (342) for accommodating the plug plate (35); and two sidewalls of the notch (342) are configured to be plugged to the assembling slots (5).

6. The decorative floor down lamp according to claim 1, wherein each of the first assembling portion (31) and the second assembling portion (32) is further provided with a second connection holes (37); the decorative floor down lamp further comprises a clamping member (6); and the clamping member (6) is configured to be mounted on the second connection holes (37), to prevent the first assembling portion (31) and the second assembling portion (32) from contracting into the lampshade (1) and prevent the mounting support (3) from falling off the lampshade (1).

7. The decorative floor down lamp according to claim 1, wherein the lamp (2) comprises a lamp holder (21) and a bulb (22) connected to the lamp holder (21); the lamp holder (21) is mounted on the mounting support (3); the lamp holder (21) is electrically connected with an electrical wire (211); and the bottom of the lampshade (1) is provided with a first wire outlet (13) and a second wire outlet (14) for allowing the electrical wire (211) to pass.

8. The decorative floor down lamp according to claim 7, wherein a group of first clamping blocks (131) are relatively arranged below the first wire outlet (13); a first space (132) is arranged between the first clamping blocks (131); a group of second clamping blocks (141) are relatively arranged below the second wire outlet (14); and a second space (142) is arranged between the second clamping blocks (141).

9. The decorative floor down lamp according to claim 1, wherein a top of the lampshade (1) is provided with a decorative portion (15).

10. The decorative floor down lamp according to claim 1, wherein the mounting support (3) is hollowed.

* * * * *